No. 812,446. PATENTED FEB. 13, 1906.
T. S. PEARSON & G. B. LINDSAY.
STRAW STACK SHAPER.
APPLICATION FILED MAY 15, 1905.
2 SHEETS—SHEET 1.
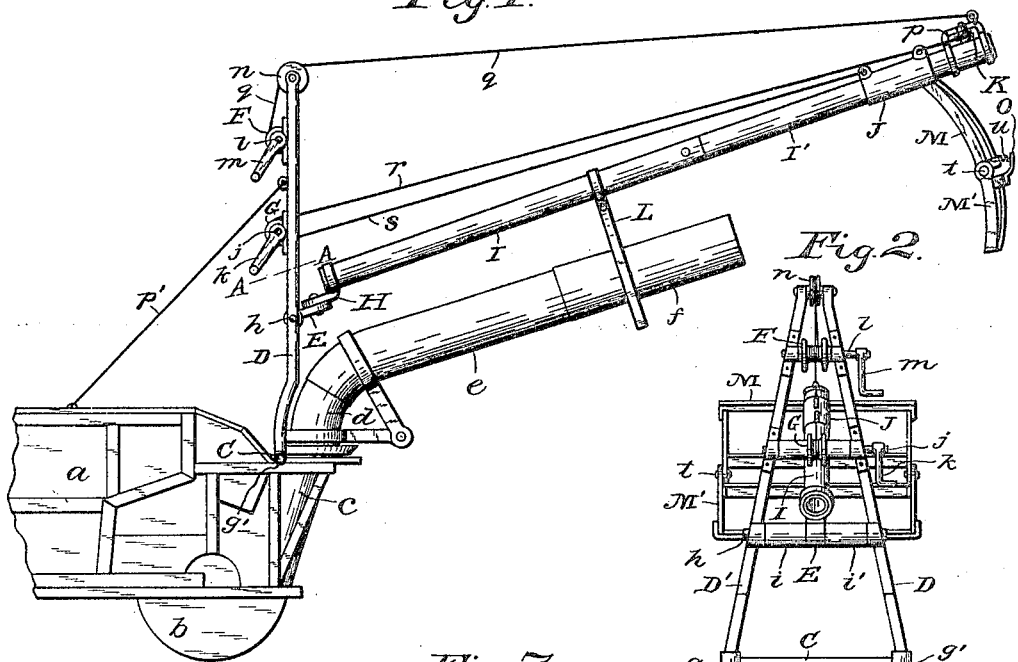
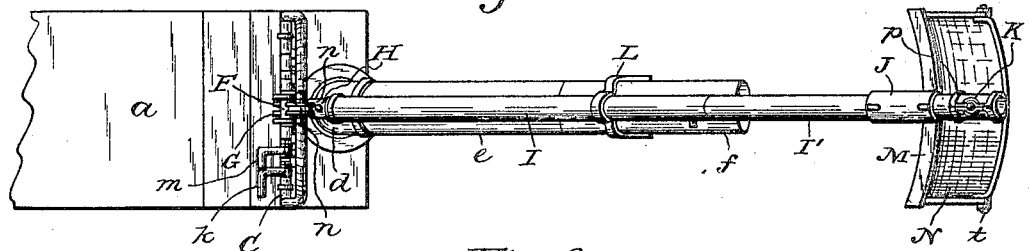
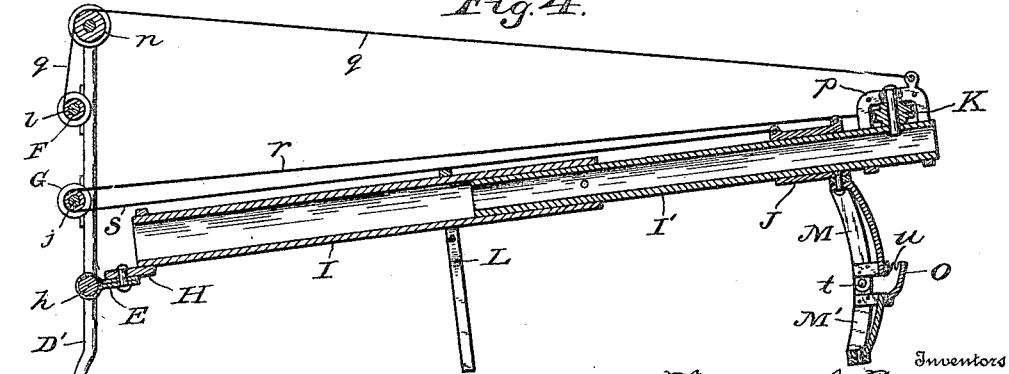
Inventors:
Thomas S. Pearson,
George B. Lindsay,
by E. J. Silvius,
Attorney.
Witnesses:
Wm H Payne
Stella Snider No. 812,446. PATENTED FEB. 13, 1906.
T. S. PEARSON & G. B. LINDSAY.
STRAW STACK SHAPER.
APPLICATION FILED MAY 15, 1905.
2 SHEETS—SHEET 2.
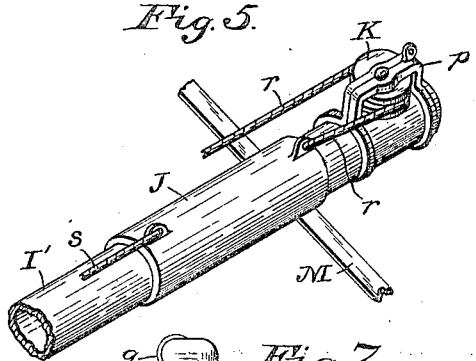
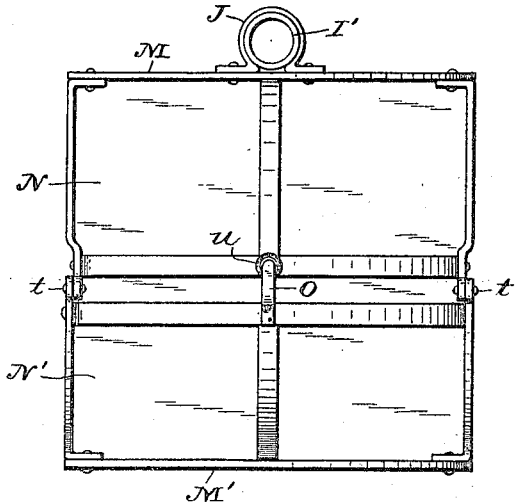
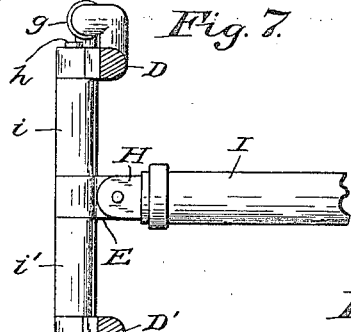
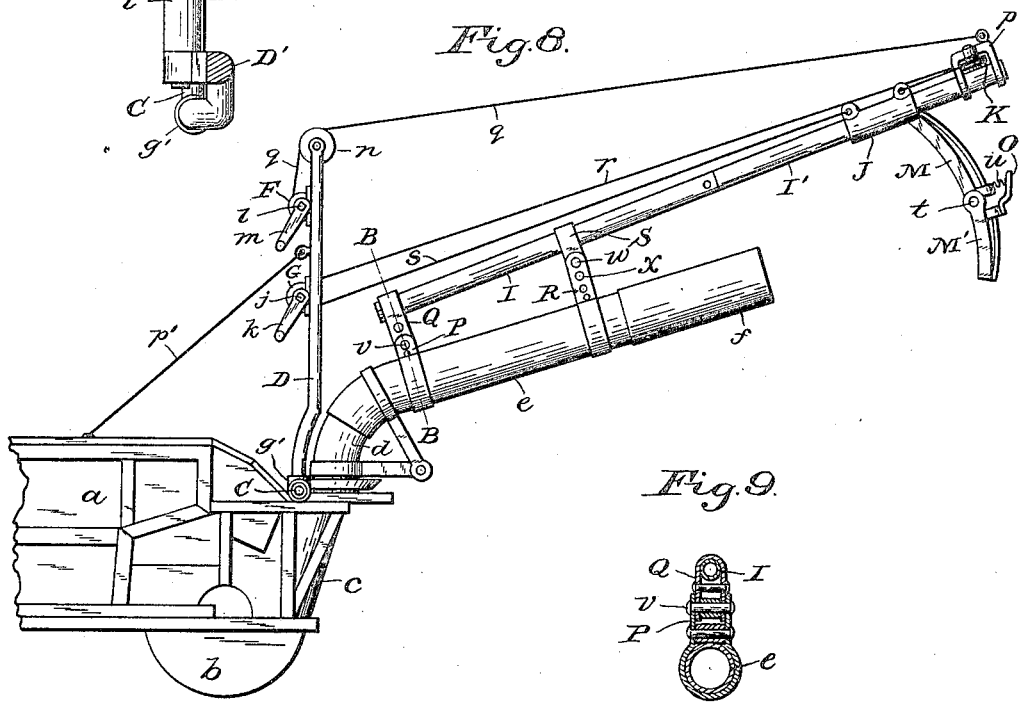
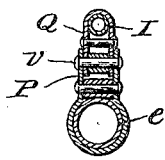
Witnesses:
Wm H Payne
Stella Snider
Inventors:
Thomas S. Pearson,
George B. Lindsay,
by E. T. Silvius,
Attorney.

# UNITED STATES PATENT OFFICE.

THOMAS S. PEARSON, OF CLAY TOWNSHIP, AND GEORGE B. LINDSAY, OF CENTER TOWNSHIP, HOWARD COUNTY, INDIANA.

STRAW-STACK SHAPER.

No. 812,446. Specification of Letters Patent. Patented Feb. 13, 1906.

Application filed May 15, 1905. Serial No. 260,379.

*To all whom it may concern:*

Be it known that we, THOMAS S. PEARSON, residing in Clay township, and GEORGE B. LINDSAY, residing in Center township, in the county of Howard and State of Indiana, citizens of the United States, have invented new and useful Improvements in Straw-Stack Shapers; and we do declare the following to be a full, clear, and exact description of the invention, reference being had to the accompanying drawings, and to the letters of reference marked thereon, which form a part of this specification.

This invention has reference to apparatus designed to be applied to grain-separators that are provided with wind-stackers for cooperation with the stackers to deflect the straw issuing therefrom in order to shape the straw-stacks while being built up to the best advantage, the invention having reference particularly to deflectors that are adjustable and controllable beyond the ends of the discharge-pipes of the stackers and referring also to the supports and the controlling apparatus for the deflectors.

Objects of the invention are to provide attachable apparatus of the above-mentioned character which may be constructed at moderate cost and adapted to be applied to separators and wind-stackers already built and with slight modification suitable to be built with the machines with which the apparatus is to be used.

The invention consists, briefly, in a boom, a deflector mounted movably on the boom, a derrick, and gearing and tackle for supporting and adjusting the boom and the deflector, the whole adapted to be folded back upon the separator when not in use; and the invention consists, specifically, in the novel parts and combinations and arrangements of parts, as hereinafter particularly described and claimed.

Referring to the drawings, Figure 1 is a side elevation showing so much of a separator as is necessary to an understanding of the invention, a wind-stacker connected thereto, and the stack-shaper apparatus connected to the separator and the wind-stacker; Fig. 2, a rear elevation of the apparatus detached from the machine; Fig. 3, a top plan of the elements, shown in Fig. 1, minor parts being omitted; Fig. 4, a longitudinal vertical sectional view taken centrally of the apparatus; Fig. 5, a fragmentary perspective view showing a portion of the boom and connecting parts; Fig. 6, an elevation of the deflector and end of its supporting-boom; Fig. 7, a fragmentary detail view, partly in section, on the line A A in Fig. 1; Fig. 8, a side elevation of the machine as in Fig. 1, to which the improved apparatus in modified form is applied; and Fig. 9, a transverse sectional view on the line B B in Fig. 8.

Similar reference characters in the various figures of the drawings designate corresponding elements or features.

In the drawings, $a$ designates the separator, $b$ the blower, $c$ the discharge-pipe of the blower, $d$ the elbow swiveled on the pipe $c$, $e$ the stacker-pipe connected to the elbow with a slip-joint and having a telescoping end $f$, all of which may be variously constructed, the usual apparatus for operating and controlling the pipe $e$ being omitted from the illustrations, it being understood that the pipe may swing back over the separator when not in use.

In the construction of the apparatus "gas-pipe" or tubing may be largely employed, especially as parts of the derrick and the boom.

The derrick comprises a base C, adapted to be mounted on the frame of the separator near the elbow $d$ of the discharge-pipe, and two uprights D and D', mounted on the base by means of suitable connections $g\ g'$. Either the base C may rotate or the connections $g\ g'$ may be pivoted to the base, so that the derrick may swing back onto the separator when not in use. A pivot-rod $h$ is mounted on the derrick in suitable bearings, and a pivot-head E is mounted on the rod, preferably between two spacing-thimbles $i$ and $i'$. In a higher plane a shaft $j$, having a crank $k$, is mounted rotatively on the derrick, and in a more elevated plane a shaft $l$, having a crank $m$, is also mounted rotatively on the derrick. A drum F is secured to the shaft $l$ and a drum G is secured to the shaft $j$. A sheave $n$ is mounted on the top of the derrick. A boom-socket H is pivoted to the pivot-head E and supports the butt-end of a tubular or hollow boom comprising a main part I and a telescoping part I' above the discharge-pipe $e$ of the stacker. A guide-sleeve J is mounted slidingly on the boom and supports the deflector. A housing $p$ is attached to the end of the boom and supports a sheave K and serves as a stop for the sleeve. A cable $q$ is connected to the housing and extends over the sheave $n$ to the drum F for supporting and adjusting the outer end of the boom. The derrick is held uprightly by a stay $p'$ or a pair of them, connected to the separator to the upper part of the derrick. A cable $r$ extends from the drum G about the sheave K and is attached to the sleeve J, and another cable $s$ extends from the drum directly to the sleeve, either cable winding onto the drum while the other unwinds therefrom, so that by turning the crank $h$ the sleeve J may be moved along the boom inwardly or outwardly, as may be desired. A yoke L is attached to the boom and extends downwardly past both sides of the pipe $e$, so that when the pipe swings laterally the boom will be moved with it.

The deflector, which is attached to the sleeve J, comprises a main frame M and a yielding frame M', connected thereto by pivots $t$, webs N and N' being attached to the frames and composed either of canvas or of metal, as may be desired. The frame M' has an arm O attached thereto, and a spring $u$ is arranged between the arm and the frame M. The deflector as a whole is dished somewhat or concave toward the end of the pipe part $f$.

In some cases the boom is supported by the pipe $e$, which is provided with a jaw P, and the boom has a jaw Q attached thereto and connected to the jaw P by a pivot $v$. Another jaw R is also attached to the pipe $e$, and a jaw S is attached to the boom I and is connected to the jaw R by a removable pin $w$, a suitable number of pin-holes $x$ being provided for adjustment of the boom relatively to the pipe. The cable $q$ may or may not be required.

It will be understood that in case the deflector is made entirely of metal the frames thereof may be modified to suit the requirements.

In practical use when the straw is blown from the stacker-pipe the attendant will adjust the boom and also the deflector so that the deflector will cause the straw to fall wherever it may be designed to place it in order to build up and shape a symmetrical and compact stack with trim sides, thus enhancing the value of the straw, especially if it may be wanted by paper-mills.

Having thus described the invention, what is claimed as new is—

1. A straw-stack shaper including a derrick, a movable boom, a guide-sleeve mounted slidingly on the boom, a deflector attached to the sleeve, a sheave mounted on the boom, a drum mounted on the derrick, a cable extending from the drum about the sheave to the sleeve, and a cable extending from the drum to the sleeve.

2. A straw-stack shaper including a boom, means for supporting the boom, a guide-sleeve mounted slidingly on the boom, a deflector attached to the sleeve and comprising a main part and a yielding part pivoted to the main part, and means for moving the sleeve on the boom.

3. The combination with a wind-stacker pipe, of a boom supported above the pipe, a guide-sleeve mounted movably on the boom, a dished deflector attached to the sleeve and extending opposite to the discharge-orifice of the pipe, and means for moving the deflector toward and from the end of the pipe.

4. The combination with a wind-stacker pipe, of a boom supported above the pipe, a guide-sleeve mounted movably on the boom, means for moving the sleeve, a deflector attached to the sleeve and comprising a main part, a yielding part pivoted to the main part and provided with an arm, and a spring engaging said arm and also the main part.

5. The combination with a wind-stacker pipe, of a boom supported above the pipe, a sheave mounted on the boom, a guide-sleeve mounted movably on the boom, a deflector attached to the sleeve and thereby supported opposite to the end of the pipe, a winding-drum, a cable connected to the drum and also to the sleeve, and a second cable also connected to the drum and extending about the sheave and attached to the sleeve.

6. The combination with a separator and a wind-stacker provided with a movable discharge-pipe, of a derrick mounted on the separator, a boom mounted above the discharge-pipe and having coöperative connection therewith, a guide-sleeve mounted movably on the boom, a sheave supported by the boom, a deflector attached to the sleeve and thereby supported opposite to the end of the pipe, a winding-drum mounted on the derrick, a cable connected to the drum and also to the sleeve, and a second cable also connected to the drum and extending about the sheave and attached to the sleeve.

7. The combination with a separator and a wind-stacker having a discharge-pipe, of a derrick mounted on the separator and provided with two winding-drums supported thereby one above the other and also having a sheave mounted at the top thereof, a stay connected to the separator and also to the derrick, a telescopic boom connected pivotally to the derrick and extending above the discharge-pipe, a guide-sleeve mounted movably on the boom and carrying a deflector opposite to the end of the discharge-pipe, a housing attached to the end of the boom and supporting a sheave, a cable connected to the upper one of the drums on the derrick and extending over the sheave that is supported by the derrick to the housing and secured thereto, a cable connected to the lower one of the drums and attached to the sleeve, and a second cable connected also to the lower drum and extending about the sheave that is mounted in the housing and attached to the sleeve.

In testimony whereof we affix our signatures in presence of two witnesses.

THOMAS S. PEARSON.
GEORGE B. LINDSAY.

Witnesses:
CARL I. McREYNOLDS,
JOEL H. RICHARDSON.